United States Patent
Doong

(10) Patent No.: US 10,882,004 B2
(45) Date of Patent: Jan. 5, 2021

(54) REDUCING PEAK COMPOSITIONS IN REGENERATION GAS FOR SWING ADSORPTION PROCESSES

(71) Applicant: UOP LLC, Des Plaines, IL (US)

(72) Inventor: Shain-Jer Doong, Kildeer, IL (US)

(73) Assignee: UOP LLC, Des Plaines, IL (US)

( * ) Notice: Subject to any disclaimer, the term of this patent is extended or adjusted under 35 U.S.C. 154(b) by 223 days.

(21) Appl. No.: 16/110,292

(22) Filed: Aug. 23, 2018

(65) Prior Publication Data
US 2020/0061517 A1 Feb. 27, 2020

(51) Int. Cl.
*B01D 53/047* (2006.01)
*B01D 53/04* (2006.01)

(52) U.S. Cl.
CPC ....... *B01D 53/047* (2013.01); *B01D 53/0462* (2013.01); *B01D 2253/108* (2013.01); *B01D 2256/245* (2013.01); *B01D 2257/504* (2013.01); *B01D 2257/7022* (2013.01); *B01D 2259/40007* (2013.01)

(58) Field of Classification Search
CPC .. B01D 53/04; B01D 53/047; B01D 53/4062; B01D 53/053; B01D 53/30; B01D 2253/108; B01D 2256/245; B01D 2257/504; B01D 2257/7022; B01D 2257/7027; B01D 2257/80; B01D 2259/40007; C10L 3/104
USPC .............................. 95/96, 130, 143, 148, 117
See application file for complete search history.

(56) References Cited

U.S. PATENT DOCUMENTS

| | | | | |
|---|---|---|---|---|
| 3,735,600 A | * | 5/1973 | Dowdell ................ | F25J 1/0282 62/619 |
| 3,897,226 A | * | 7/1975 | Doherty ................. | B01D 53/04 95/12 |
| 2007/0006729 A1 | * | 1/2007 | Mitariten ........... | B01D 53/0462 95/92 |
| 2010/0071551 A1 | * | 3/2010 | Monereau ................. | C01B 3/56 95/96 |
| 2013/0192299 A1 | * | 8/2013 | Dolan ...................... | C10G 5/02 62/636 |
| 2014/0208797 A1 | * | 7/2014 | Kelley ................... | F25J 1/0042 62/611 |
| 2015/0290575 A1 | | 10/2015 | Rothermel et al. | |

FOREIGN PATENT DOCUMENTS

| | | |
|---|---|---|
| WO | 2005089237 A2 | 9/2005 |
| WO | 2013116627 A1 | 8/2013 |

OTHER PUBLICATIONS

International Search Report for corresponding International Application No. PCT/US2019/047644 dated Nov. 21, 2019.

* cited by examiner

*Primary Examiner* — Frank M Lawrence, Jr.

(57) ABSTRACT

This invention provides a method to smooth out the concentration peak generated from the regeneration stream of a cyclic adsorption process such as PTSA or TSA process. A fixed-bed adsorber (called a capacitor) to process the spent regeneration gas from a TPSA or TSA unit to maintain a constant composition of the spent regeneration gas to the downstream unit. The adsorber operates in a once-through non-cyclic manner, very similar to the conventional fixed bed reactor or adsorber. The spent regeneration gas stream coming out of the adsorber will have a more uniform $CO_2$ composition than without the capacitor.

11 Claims, 4 Drawing Sheets

REDUCING PEAK COMPOSITIONS IN REGENERATION GAS FOR SWING ADSORPTION PROCESSES

BACKGROUND OF THE INVENTION

This invention relates to the processing of natural gas that is treated for use as liquefied natural gas. In particular, this invention relates to a process of treating the regeneration gas to deal with excess carbon dioxide in the regeneration gas.

In liquefied natural gas (LNG) peak shaver plants, thermal swing adsorption (TSA) processes have been widely used for removal of water and $CO_2$ from natural gas to prevent freezing in LNG production. In the course of the operation of the TSA process, after removing carbon dioxide from the natural gas stream, a regeneration gas stream such as a portion of a purified gas stream is passed through the adsorbent bed at an elevated temperature. The spent regeneration gas that generally returns back to the pipeline that includes removed $CO_2$ is difficult to be further separated from the spent regeneration gas. For LNG operators, other than those operating peak shaver plants, returning the spent regeneration gas back to the pipeline may not be an option to them. The other alternative is to use this spent regeneration gas as a fuel, which can be potentially used to generate power to drive the compressors for the downstream liquefaction train. LNG peak shaver plants utilize LNG to provide electricity at times of peak usage.

Due to the dynamic nature of the TSA process, the compositions in the effluent regeneration stream tend to vary with time, generating a peak $CO_2$ concentration, several orders of magnitude higher than its average concentration. The fluctuation of stream compositions can result in unstable operation for downstream units, especially if combustion or incineration is involved in these downstream processing units. Consequently, the spent regeneration gas from an adsorption process such as TSA is not suitable as a fuel without further processing or blending with other fuel gas.

DETAILED DESCRIPTION OF THE INVENTION

Several different types of adsorption processes may be used including a thermal pressure swing adsorption (TPSA) process to remove $CO_2$, water and heavy hydrocarbons to prevent freezing in the production of liquefied natural gas. While TPSA may have the advantage of reducing the spent regeneration gas requirement compared to a conventional $CO_2$ TSA process, TPSA still generates a spent regeneration stream with fluctuations or peaks of $CO_2$ composition. This invention provides a method to smooth out the concentration peak generated from the regeneration stream of a cyclic adsorption process such as PTSA or TSA process.

Figure 1:
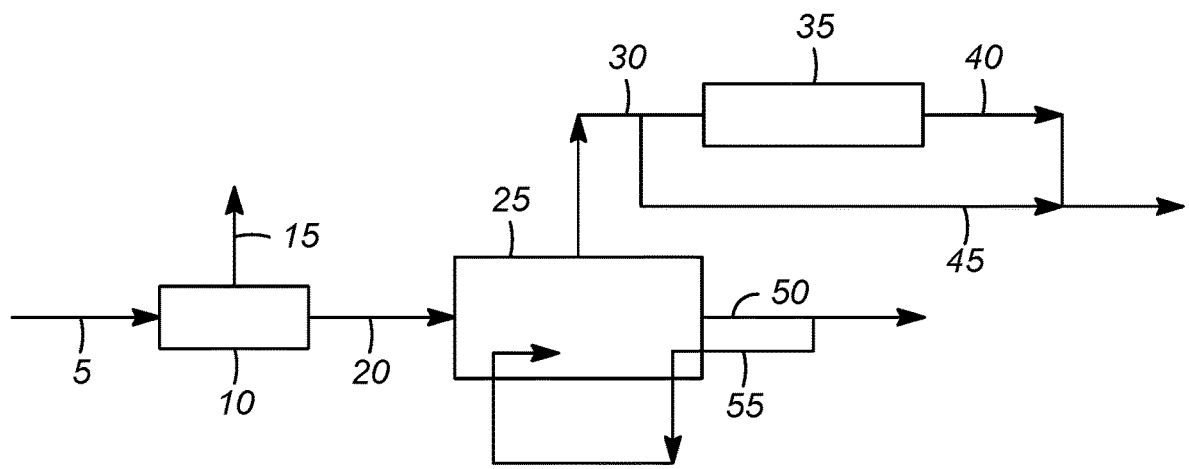
FIG. 1 shows the use of a capacitor to dampen carbon dioxide peak in an adsorption system.

This invention uses a fixed-bed adsorber (called a capacitor) to process the spent regeneration gas from a TPSA or TSA unit to maintain a constant composition of the spent regeneration gas to the downstream unit. The adsorber operates in a once-through non-cyclic manner, very similar to the conventional fixed bed reactor or adsorber. The spent regeneration gas stream coming out of the adsorber will have a more uniform $CO_2$ composition than without the capacitor. FIG. 1 is a block flow diagram showing a capacitor unit after a PTSA unit to produce what becomes fuel gas.

FIG. 1 shows an embodiment of this invention, where a portion of the spent regeneration gas can bypass the fixed-bed adsorber, and recombine the stream passing the adsorber. It now has been found that by operating a capacitor at a high temperature around 100° C., a capacitor can have a much better performance than at 25° C. which is a temperature often used in the past in connection with the production of fuel gas.

Figure 2:
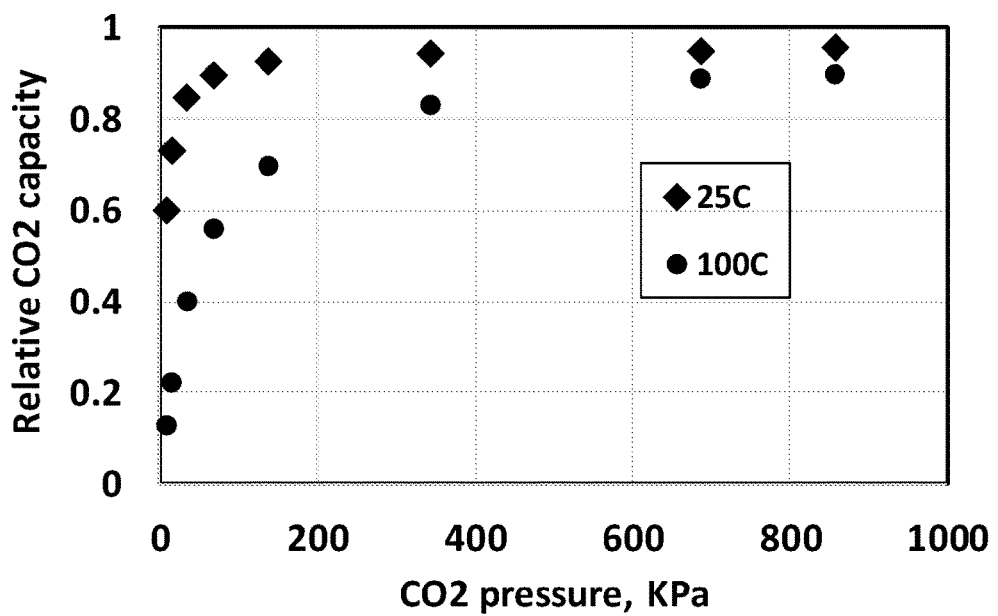
FIG. 2 shows relative carbon dioxide adsorption isotherms on a 4A molecular sieve zeolite at 25° C. and 100° C.

Adsorbents that can be used in the capacitor to smooth out $CO_2$ composition peak are those that are typically used in the TPSA or TSA process, such as 4A or 13X type of molecular sieve. The TPSA or TSA process using 4A or 13X adsorbent generally can remove $CO_2$ for a natural gas feed stream with a $CO_2$ composition below 3%, or preferably below 2%. This is mainly due to the $CO_2$ adsorption isotherm of 4A/13X at 25° C. reaches a maximum or saturation value when the $CO_2$ composition exceeds 3% in a natural gas feed stream with a typical pressure greater than 500 psig, or more typically greater than 800 psig. FIG. 2 shows $CO_2$ adsorption isotherms on 4A at 25 and 100° C. with the higher values at the lower temperatures. As can be seen, $CO_2$ adsorption capacity reaches nearly a maximum when its partial pressure is greater than about 25 psia at 25 C. For a 1000 psia gas pressure, 25 psia corresponds to about 2.5% $CO_2$.

In the spent regeneration gas stream, the $CO_2$ composition is expected to be much higher than the feed gas stream, sometimes as much as 10 times higher at the peak value. The increase of $CO_2$ composition in the spent regeneration gas is even more pronounced with the PTSA cycle, where the spent regeneration gas is reduced compared to a TSA cycle. As a result, a capacitor packed with 4A molecular sieve operating in the neighborhood of 25 C will not function properly. However, FIG. 2 also shows that at 100° C., a differential $CO_2$ capacity becomes possible for $CO_2$ partial pressure below 50 psia. Thus a capacitor is expected to work properly at a temperature about 100° C. or higher. As the spent regeneration gas coming out of a PTSA or TSA process is already at a high temperature, the capacitor can be conveniently operating at the incoming gas stream temperature without further cooling or heating means.

A natural gas stream with a composition shown in Table 1 is to be converted to LNG. The gas is at 25° C. and 900 psig. A PTSA process as shown in FIG. 1 is used to remove its water, carbon dioxide and C5+ hydrocarbons before entering the liquefaction train.

FIG. 1 shows a basic flow scheme for the invention in which a natural gas stream 5 is sent to a first adsorption unit 10 that produces partially purified natural gas stream 20 with impurities removed by a regeneration stream (not shown) that contains water, heavier hydrocarbons (C8+) and aromatics in stream 15. Partially purified natural gas stream 20 passes through pressure temperature swing adsorption unit 25 to produce a purified natural gas stream 50. A portion 55 of purified natural gas stream is returned to pressure temperature adsorption unit 25 to regenerate the adsorbent. A spent regeneration gas stream 30 then exits pressure temperature adsorption swing adsorption unit 25 containing carbon dioxide and some C7− hydrocarbons to pass through capacitor 35 to dampen carbon dioxide concentration peak and exiting in stream 40. A portion of spent regeneration gas stream 30 may bypass capacitor 35 in stream 45 and combined with stream 40.

Example 1

Figure 3:
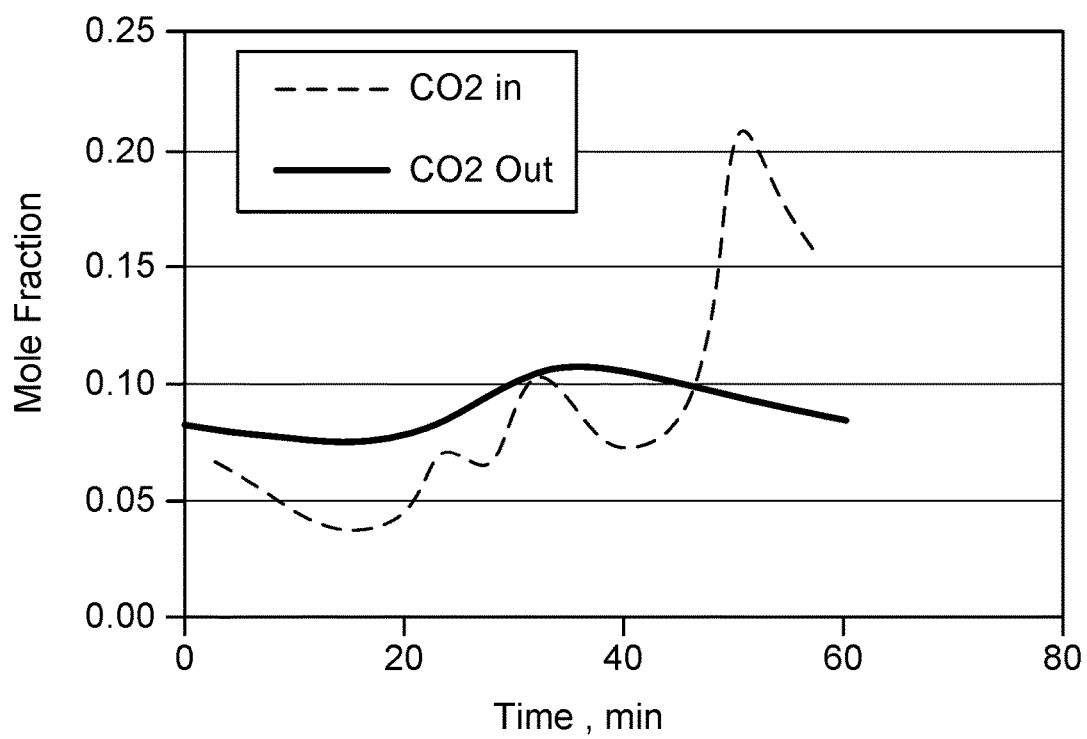
FIG. 3 shows the carbon dioxide composition of a spent regeneration gas before and after the capacitor for Example 1.
Figure 4:
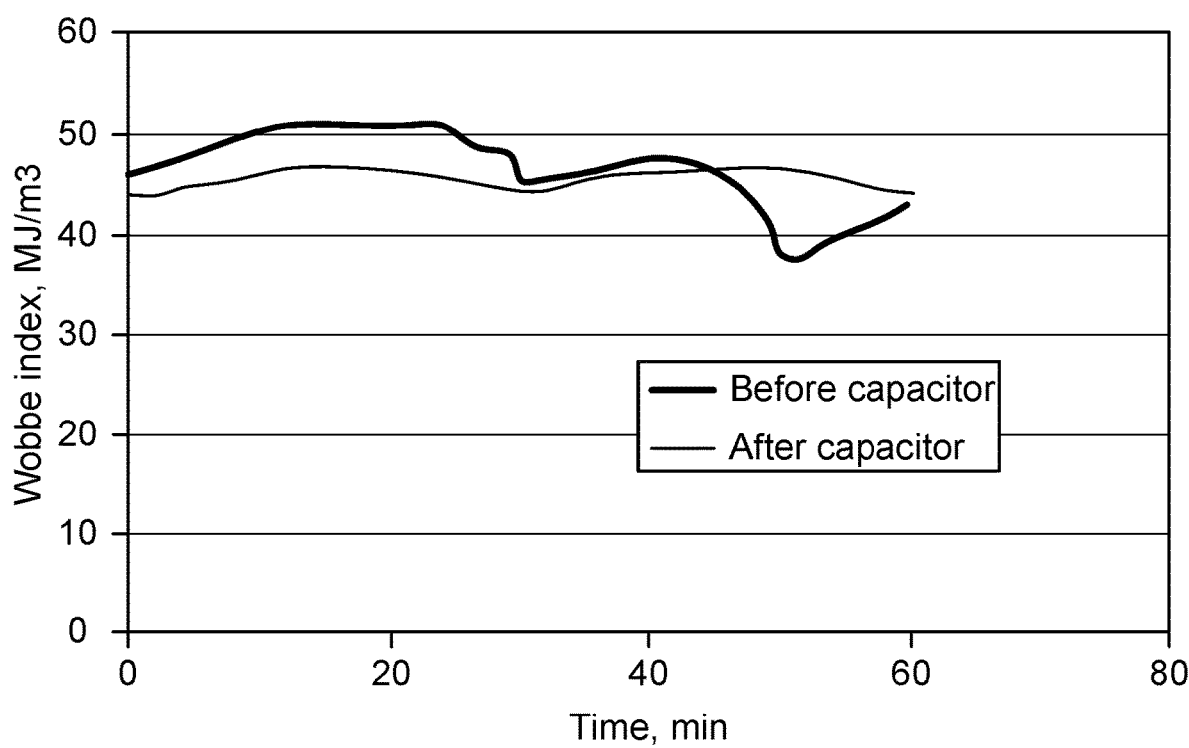
FIG. 4 shows the Wobbe Index of the spent regeneration gas before and after the capacitor.

The feed gas has the composition as shown in Table 1. In Example 1, where the LNG product is 16 MMSCFD, the required spent regeneration gas pressure is at 70 psia. A capacitor packed with UOP's UI-900 (a 4A product) is used to dampen the $CO_2$ composition of the spent regeneration gas. No cooling or heating is performed to reduce the temperature of the spent regeneration gas from the PTSA adsorbers. And the capacitor is operating at temperatures varying from 80° to 170° C. FIG. 3 and FIG. 4 show the $CO_2$ composition and Wobbe index, respectively before and after the capacitor. The spent regeneration gas meeting the variation limit of the Wobbe index generally can be achieved with a capacitor. As per international practice, +4% variation in Wobbe index is generally acceptable. The Wobbe Index (WI) or Wobbe Number is an indicator of the interchangeability of fuel gases such as natural gas, liquefied petroleum gas (LPG), and town gas and is frequently defined in the specifications of gas supply and transport utilities.

TABLE 1

Feed Gas Composition

| Gas | Amount |
| --- | --- |
| Nitrogen | 5.07E−03 |
| Methane | 9.46E−01 |
| Ethane | 2.20E−02 |
| Propane | 3.84E−03 |
| i-Butane | 9.15E−04 |
| n-Butane | 9.15E−04 |
| i-Pentane | 2.29E−04 |
| n-Pentane | 6.53E−04 |
| n-Hexane | 1.01E−04 |
| n-Heptane | 1.89E−04 |
| n-Octane | 1.27E−04 |
| n-Nonane | 8.46E−05 |
| Cyclopentane | 1.89E−05 |
| Cyclohexane | 3.38E−05 |
| Mcyclopentane | 7.36E−05 |
| Mcyclohexane | 0.00E+00 |
| Benzene | 5.47E−05 |
| E-Benzene | 2.98-E−05 |
| Toluene | 3.28E−05 |
| p-Xylene | 1.29E−05 |
| 2C3Mercaptan | 0.00E+00 |
| t-B-Mercaptan | 0.00E+00 |
| Water | 1.46E−04 |
| Hydrogen sulfide | 4.97E−07 |

Example 2

Figure 5:
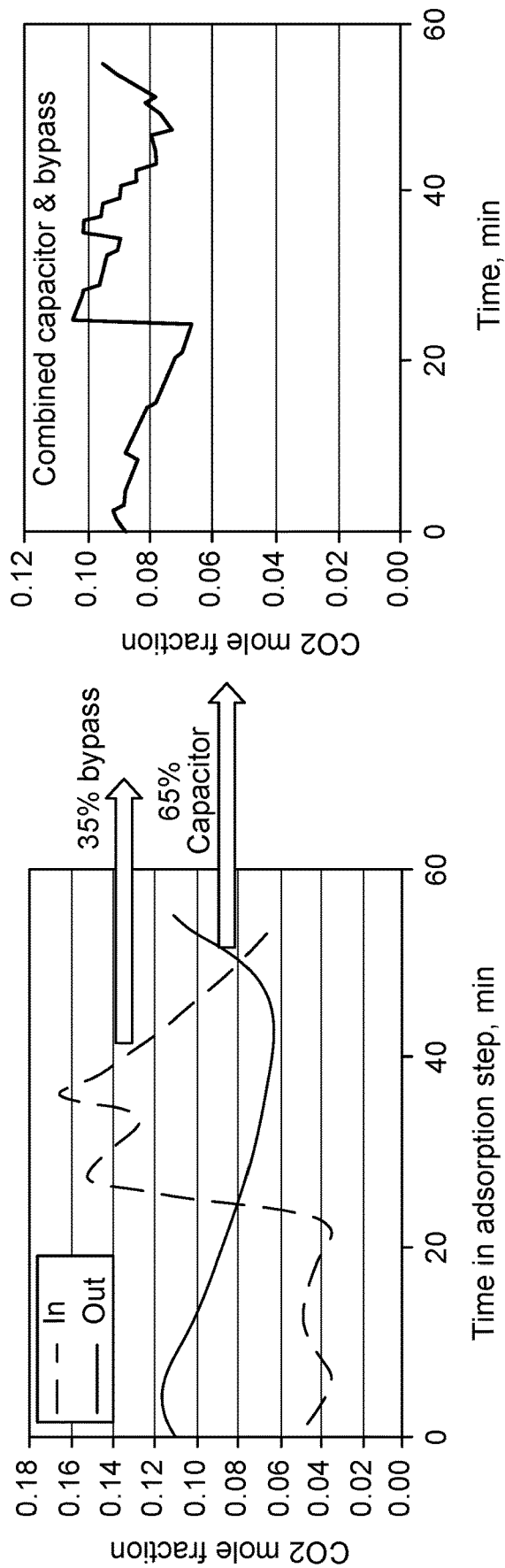
FIG. 5 shows a carbon dioxide composition of the 65% spent regeneration gas before and after the capacitor and the carbon dioxide composition of combined streams.

In the second example, where the LNG product is 200 MMSCFD, the required spent regeneration gas pressure is at 500 psia. A capacitor packed with UOP's UI-900 (a 4A product) is used to dampen the $CO_2$ composition of the spent regeneration gas. In this example, about 35% of the spent regeneration gas by-passes the capacitor and only 65% of the gas enters the capacitor. Both streams then combine in the downstream of the capacitor. FIG. 5a shows the $CO_2$ compositions before and after the capacitor for the 65% of the gas entering the capacitor. The $CO_2$ compositions after combining this stream with the remaining 35% stream are shown in FIG. 5b. As can be seen, the $CO_2$ peak shifts to a different time after the capacitor due to the dynamic nature of the capacitor.

Figure 6:
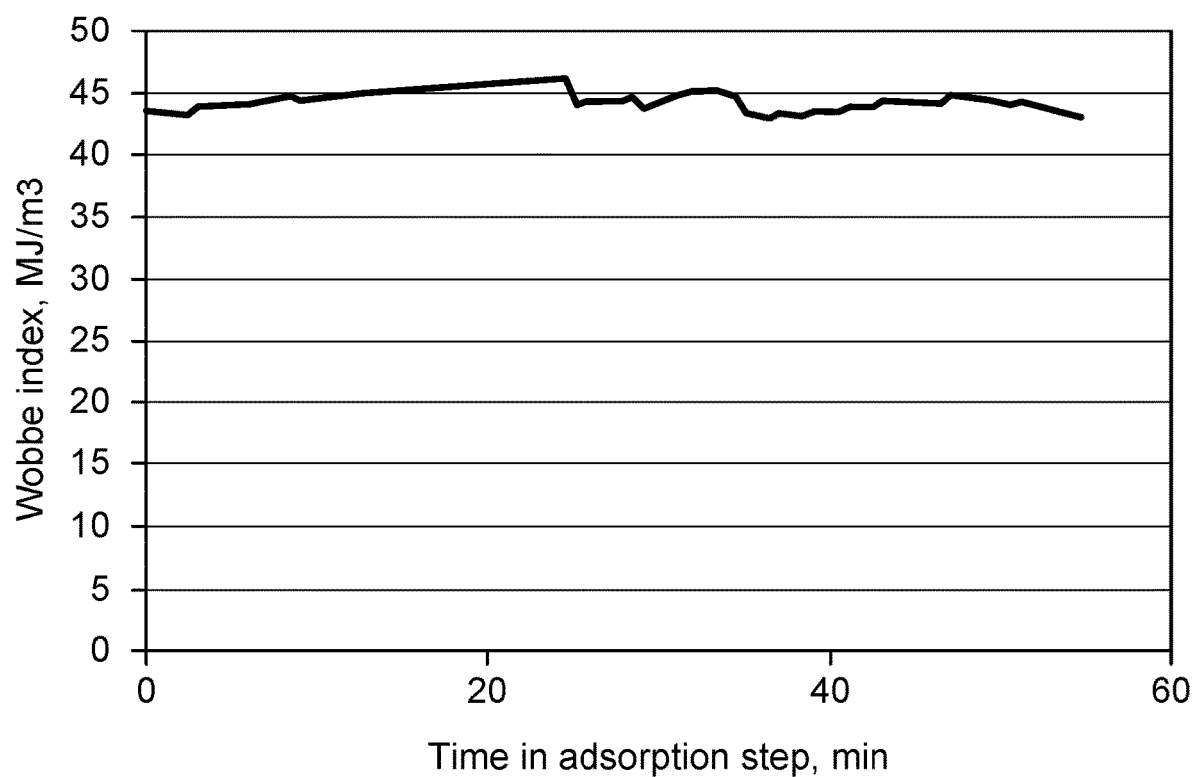
FIG. 6 shows a Wobbe Index for a combined spent regeneration gas stream after the capacitor for Example 2.

FIG. 6 shows the Wobbe index for the combined spent regeneration gas. The Wobbe index variation is within ±4%.

Any of the above conduits, unit devices, scaffolding, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

While the following is described in conjunction with specific embodiments, it will be understood that this description is intended to illustrate and not limit the scope of the preceding description and the appended claims.

A first embodiment of the invention is a process for reducing peak levels of impurities in an adsorption bed regeneration gas stream comprising sending a gas stream through a first adsorption bed to remove water, heavy hydrocarbons, and aromatic compounds to produce a partially purified gas stream, then sending the partially purified gas stream through an adsorption bed to remove carbon dioxide and C7− hydrocarbons wherein the carbon dioxide and C7− are a fuel gas stream, and then sending a portion of the fuel gas stream through a capacitor to reduce the peak level of the carbon dioxide concentration. An embodiment of the invention is one, any or all of prior embodiments in this paragraph up through the first embodiment in this paragraph wherein the first adsorption bed is a temperature swing adsorption bed. An embodiment of the invention is one, any or all of prior embodiments in this paragraph up through the first embodiment in this paragraph wherein the adsorption bed is a pressure swing adsorption bed. An embodiment of the invention is one, any or all of prior embodiments in this paragraph up through the first embodiment in this paragraph wherein the adsorption bed is a pressure temperature swing adsorption bed. An embodiment of the invention is one, any or all of prior embodiments in this paragraph up through the first embodiment in this paragraph wherein the capacitor is an adsorption bed. An embodiment of the invention is one, any or all of prior embodiments in this paragraph up through the first embodiment in this paragraph wherein a purified gas stream exits the adsorption bed An embodiment of the invention is one, any or all of prior embodiments in this paragraph up through the first embodiment in this paragraph wherein the gas stream comprises a natural gas stream. An embodiment of the invention is one, any or all of prior embodiments in this paragraph up through the first embodiment in this paragraph wherein the capacitor is operated at about 80° to 180° C. An embodiment of the invention is one, any or all of prior embodiments in this paragraph up through the first embodiment in this paragraph wherein the capacitor is operated at about 100° C. An embodiment of the invention is one, any or all of prior embodiments in this paragraph up through the first embodiment in this paragraph wherein the fuel gas stream is at a pressure between 50 to 500 psig when passing through the capacitor. An embodiment of the invention is one, any or all of prior embodiments in this paragraph up through the first embodiment in this paragraph wherein about 30 to 100% of the fuel gas passes through the capacitor. An embodiment of the invention is one, any or all of prior embodiments in this paragraph up through the first embodiment in this paragraph wherein a level of carbon dioxide in the fuel gas is from about 0 to 0.6 mole fraction. An embodiment of the invention is one, any or all of prior embodiments in this paragraph up through the first embodiment in this paragraph, further comprising at least one of sensing at least one parameter of the process and generating a signal from the sensing; sensing at least one parameter of the process and generating data from the sensing; generating and transmitting a signal; generating and transmitting data.

The invention claimed is:

1. A process for reducing peak levels of impurities in an adsorption bed regeneration gas stream comprising:

sending a gas stream through a first adsorption bed to remove water, heavy hydrocarbons, and aromatic compounds to produce a partially purified gas stream;

then sending said partially purified gas stream through an adsorption bed to remove carbon dioxide and C7− hydrocarbons wherein said carbon dioxide and C7− are a fuel gas stream; and then sending a portion of said fuel gas stream through a capacitor to reduce a peak level of said carbon dioxide, wherein said capacitor is operated at about 100 to 180° C.

2. The process of claim 1 wherein said first adsorption bed is a temperature swing adsorption bed.

3. The process of claim 1 wherein said adsorption bed is a pressure swing adsorption bed.

4. The process of claim 1 wherein said adsorption bed is a pressure temperature swing adsorption bed.

5. The process of claim 1 wherein said capacitor is an adsorption bed.

6. The process of claim 1 wherein a purified gas stream exits said adsorption bed.

7. The process of claim 1 wherein said gas stream comprises a natural gas stream.

8. The process of claim 1 wherein said capacitor is operated at about 100° C.

9. The process of claim 1 wherein said fuel gas stream is at a pressure between 50 to 500 psig when passing through said capacitor.

10. The process of claim 1 wherein about 30 to 100% of said fuel gas passes through said capacitor.

11. The process of claim 1, further comprising at least one of:

sensing at least one parameter of the process and generating a signal from the sensing;

sensing at least one parameter of the process and generating data from the sensing;

generating and transmitting a signal;

generating and transmitting data.

* * * * *